United States Patent
Reibling et al.

(10) Patent No.: US 10,128,473 B2
(45) Date of Patent: Nov. 13, 2018

(54) BATTERY STRUCTURE HAVING AN ABSORBENT LINING IMPREGNATED WITH A BASE FOR CONTAINMENT AND NEUTRALIZATION OF ACID

(71) Applicant: Ford Global Technologies, LLC, Dearborn, MI (US)

(72) Inventors: Michael Reibling, Sterling Heights, MI (US); Steven Michael Cyr, Lake Orion, MI (US); Raymond C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 507 days.

(21) Appl. No.: 14/721,413

(22) Filed: May 26, 2015

(65) Prior Publication Data

US 2016/0351863 A1 Dec. 1, 2016

(51) Int. Cl.
*H01M 2/10* (2006.01)
*B60L 11/18* (2006.01)

(52) U.S. Cl.
CPC ....... *H01M 2/1072* (2013.01); *B60L 11/1879* (2013.01); *H01M 2/1094* (2013.01); *B60L 2240/545* (2013.01); *H01M 2220/20* (2013.01); *Y02T 10/7005* (2013.01); *Y02T 10/705* (2013.01)

(58) Field of Classification Search
None
See application file for complete search history.

(56) References Cited

U.S. PATENT DOCUMENTS

| 4,675,218 A | 6/1987 | Hendricks |
| 5,270,136 A | 12/1993 | Noland |
| 2010/0112424 A1* | 5/2010 | Hayashi .............. H01M 2/1077 429/99 |
| 2011/0183169 A1* | 7/2011 | Bhardwaj ......... H01M 10/0431 429/94 |

FOREIGN PATENT DOCUMENTS

GB 1235693 6/1971

OTHER PUBLICATIONS

Definition of fold from www.dictionary.com (Year: 2017).*
Definition of pouch from www.dictionary.com (Year: 2017).*

* cited by examiner

*Primary Examiner* — Miriam Stagg
*Assistant Examiner* — Carmen V Lyles-Irving
(74) *Attorney, Agent, or Firm* — David B. Kelley; Brooks Kushman P.C.

(57) ABSTRACT

A battery system of a vehicle includes a battery, a battery tray configured to support the battery, and a battery pouch. The pouch has a plurality of side walls and a bottom defining a space sized to accommodate the battery. The side walls each include an absorbent layer containing a base, such as sodium bicarbonate, and an outer layer impervious to the electrolyte and the base. One of the side walls is a front side wall that includes a wedge that is configured to mate with a front of the battery and the tray. The wedge cooperates with a bottom lip of the battery to secure the battery to the tray.

13 Claims, 1 Drawing Sheet

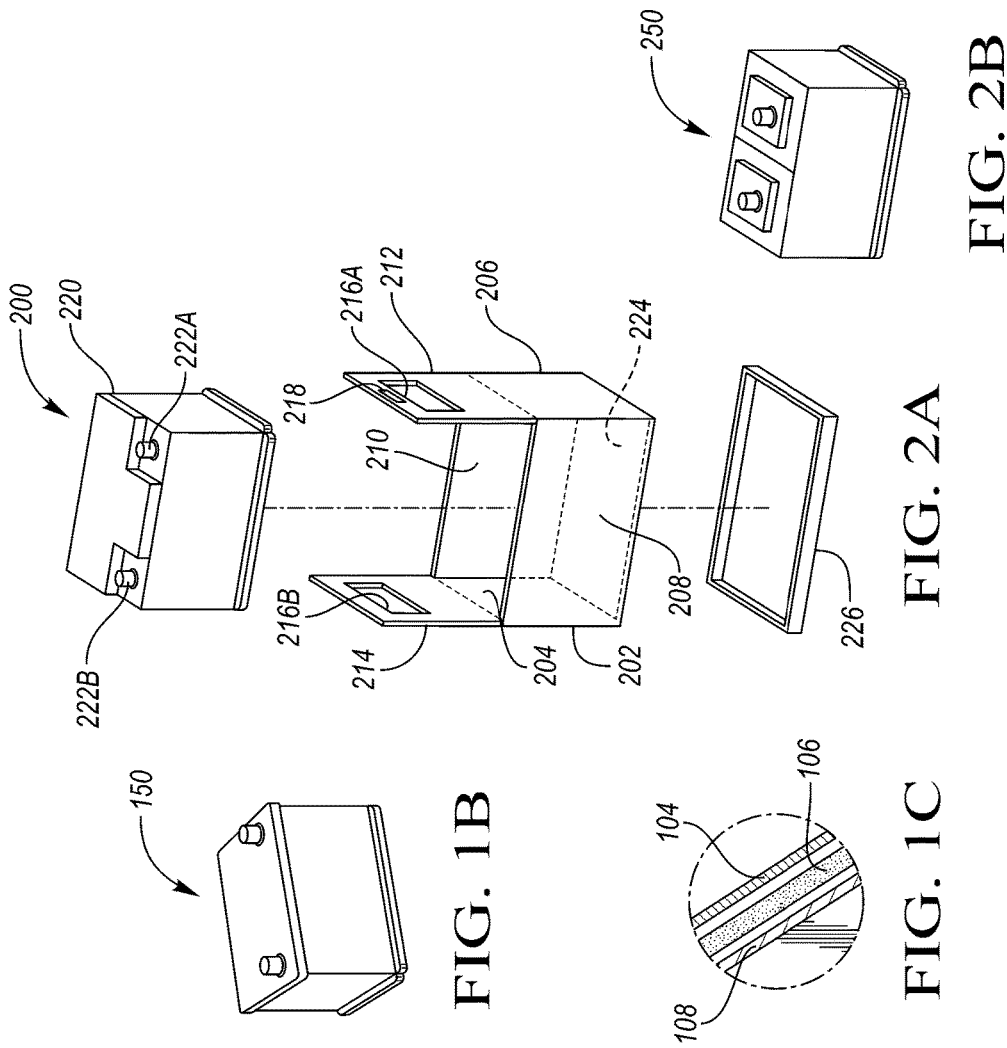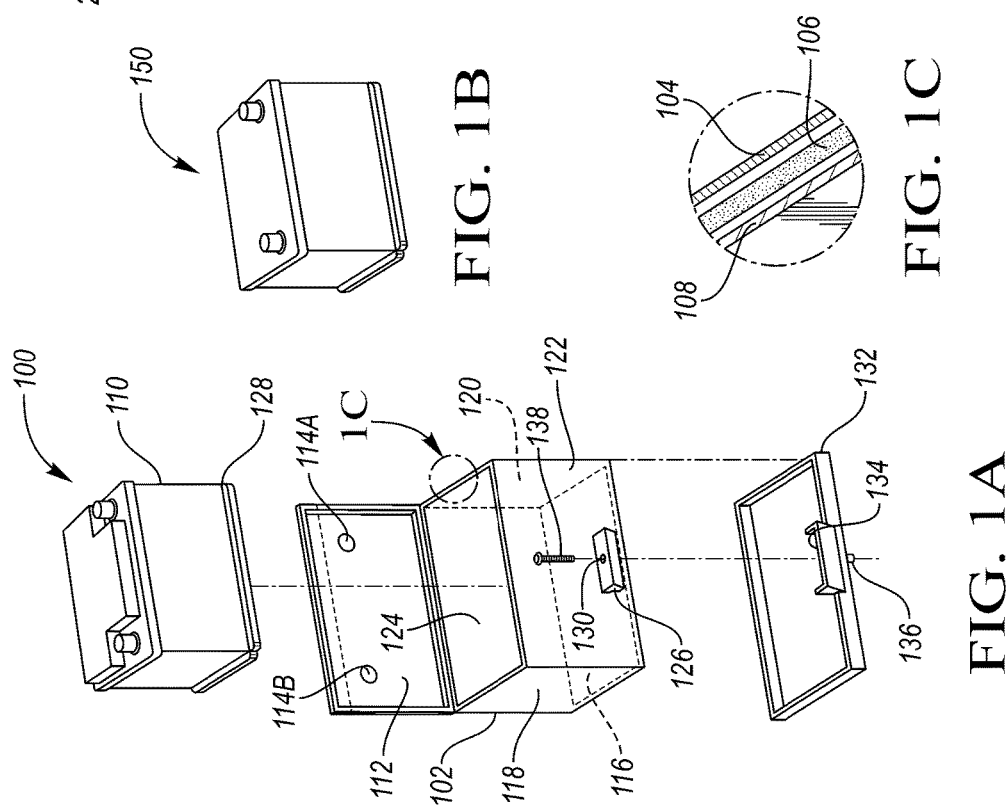

BATTERY STRUCTURE HAVING AN ABSORBENT LINING IMPREGNATED WITH A BASE FOR CONTAINMENT AND NEUTRALIZATION OF ACID

TECHNICAL FIELD

This disclosure relates to protective battery system structures for vehicle batteries.

BACKGROUND

Vehicles including electric vehicles use batteries such as lead-acid 12V batteries. Due to variations in vehicle design and design constraints, these batteries may be packaged in a variety of locations including the trunk, passenger compartment, or under the seats.

SUMMARY

A vehicle battery system includes a battery having an acidic electrolyte, a battery tray configured to support the battery, and a pouch. The pouch has a plurality of side walls and a bottom defining a space sized to accommodate the battery. Each of the side walls includes an absorbent layer containing a base and an outer layer impervious to the electrolyte and the base. One of the side walls includes a wedge configured to cooperate with a bottom lip of the battery and the tray to secure the battery to the tray. The wedge may define a hole generally aligned with a threaded receiver of the tray and configured to permit a bolt to pass thru the hole to secure the wedge to the tray. The wedge may define a slot generally aligned with a threaded receiver of the tray and configured to permit a bolt to pass thru the slot to secure the wedge to the tray. The system may further include a top wall extending from one of the side walls and sized and configured to fold over a top of the battery. The top wall may further define two openings generally aligned with terminals of the battery to allow the battery terminals to pass through the openings. Two opposing side walls may extend beyond a height of the battery such that the opposing side walls connect when folded over a top of the battery. The two opposing side walls define two slots configured as handles to facilitate lifting the pouch. The base may be a carbonate or hydroxide of an alkali or alkaline earth metal. The absorbent layer may be a felt. The outer layer may be an olefin polymer.

A vehicle includes an interior compartment, a battery having an acidic electrolyte, a battery tray disposed within the interior compartment and configured to support the battery, and a pouch. The pouch has a plurality of side walls and a bottom defining a space sized to accommodate the battery. The side walls each include an absorbent layer containing a base and an outer layer impervious to the electrolyte and the base. Two opposing side walls extend beyond a height of the battery such that the opposing side walls connect when folded over a top of the battery.

The base may be a carbonate or hydroxide of an alkali or alkaline earth metal. The two opposing side walls may define two slots configured as handles to facilitate lifting the pouch. The interior compartment may be a trunk or passenger compartment. One of the plurality of side walls may include a wedge configured to cooperate with a bottom lip of the battery and the tray to secure the battery to the tray. The wedge may define a hole generally aligned with a threaded receiver of the tray and configured to permit a bolt to pass thru the hole to secure the wedge to the tray.

A vehicle battery pouch arrangement includes a pouch having a plurality of side walls, a bottom wall, and a top wall defining a space sized to accommodate a battery. The walls each include an absorbent layer containing a base and an outer layer impervious to an acid and the base. The top wall extends from one of the side walls and is configured to fold over a top of the battery.

The top wall may further define two openings generally aligned with terminals of the battery allowing the battery terminals to pass through the openings. One of the plurality of side walls may include a wedge configured to cooperate with a bottom lip of the battery and a battery tray to secure the battery to the tray. The wedge may define a hole generally aligned with a threaded receiver of the tray and configured to permit a bolt to pass thru the hole to secure the wedge to the tray.

BRIEF DESCRIPTION OF THE DRAWINGS

FIG. 1A is an exploded view of an exemplary battery system including a battery, battery tray, and battery pouch having an integrated wedge, and a cross section view of layers of the battery pouch.

FIG. 1B is a perspective view of an exemplary battery system.

FIG. 1C is an expanded cross-sectional view of a battery pouch.

FIG. 2A is an exploded view of an exemplary battery system including a battery, battery tray, and battery pouch having integrated handles.

FIG. 2B is a perspective view of an exemplary battery system.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

As vehicle designs vary, so do the location of the batteries. Some vehicles are designed with a vehicle battery, including a flooded lead acid battery, located in a passenger compartment or luggage compartment of the vehicle. This placement may require special considerations for service attendants that may be required to remove a battery without facilitating electrolyte leakage to surrounding compartments or structures. One exemplary structure is a multi-layered cloth-like container or pouch that has been impregnated with a neutralizing base material. The pouch may be configured to retain the volume of the electrolyte in the battery and may include extended sidewalls to provide splash prevention. The pouch exterior having an outer layer and an absorbent layer may also provide insulation from transient temperatures to the battery. This battery pouch is intended for a low voltage battery such as a 12 Volt lead-acid battery, but could be used with a variety of battery technologies including low voltage lithium ion-batteries.

FIG. 1A is an exploded view of an exemplary battery system 100 including a battery 110, battery tray 132, and battery pouch 102 having an integrated wedge 126, and a cross-section view of layers of the battery pouch. The battery pouch 102 includes of an outer layer 104 and an absorbent layer 106. The outer layer 104 may be impervious to chemicals such as an acidic battery electrolyte and a base such as a carbonate or hydroxide of an alkali or alkaline earth metal. An example of an alkali metal carbonate is sodium bicarbonate ($NaHCO_3$). An example of an alkaline earth metal carbonate is calcium carbonate ($CaCO_3$). An example of an alkali metal hydroxide is sodium hydroxide (NaOH) An example of an alkaline earth metal hydroxide is calcium hydroxide ($Ca(OH)_2$). The outer layer 104 may include a polymer including an olefin polymer such as polypropylene or polyethylene. The absorbent layer 106 may include a felt such as a wool felt, a cotton felt, a wood fiber felt, or a polyacrylonitrile felt. The absorbent layer may be soaked or impregnated with the base such that any leak, spill or overflow of the acidic battery electrolyte will be neutralized by a corresponding base. The absorbent layer 106 may also include a material configured to gel upon activation by electrolyte of the battery. The battery pouch 102 may also include an inner layer 108 that may be a semi-permeable membrane to allow a fluid, such as the acidic battery electrolyte to pass through. The semi-permeable membrane may include a polyamide, or an olefin polymer such as polypropylene or polyethylene. Once the battery acid passes the membrane, the acid may react with chemicals or materials in the absorbent layer 106 to form larger molecules thereby trapping the fluid in the absorbent layer 106.

In this exemplary illustration, the pouch 102 includes a top flap or top wall 112 that may define holes 114 such as a first hole 114A for a first terminal and a second hole 114B for a second terminal. The first and second terminals include a positive terminal and a negative terminal. The top 112 is configured to cover a top of the battery 110 such that terminals of the battery align with the holes 114 and are accessible through the holes 114. The pouch 102 includes a bottom wall 116 or bottom and side walls 118, 120, 122, and 124. The bottom 116 and side walls 118, 120, 122, and 124 are sealed to contain the battery contents. In this exemplary illustration, a front wall of the pouch 102 includes a slide wedge 126 also referred to as a wedge. The wedge 126 may be integrated into the outer layer 104, or it may be attached to the pouch 102. The wedge 126 is configured to cooperate with a battery lip 128 to secure the battery to a battery tray 132. The wedge 126 may include a hole 130 that is aligned with a ramp 134 on the battery tray 132 configured to allow a bolt 138 to secure the wedge 126 and battery 110 to the battery tray 132 using a threaded receiver 136. The wedge 126 is illustrated on the front of the pouch 102, but could be located on any of the other side walls 118, 120, 122, or 124 of the battery pouch 102, such that the wedge 126 engages the battery lip and is aligned with the ramp 134 located on a corresponding side of the battery tray 132.

FIG. 1B is a perspective view of an exemplary battery system 150. The battery system 150 is shown assembled having the terminals accessible through the holes, however, other embodiments may not include the holes and cables from the vehicle may be connected with the battery and then the top flap would be secured over the terminals and cables thereby being accessible via a gap between sidewalls 118 and the top 112, or a gap between sidewalls 120 and the top 112. The pouch may be configured to retain all or a substantial volume of the electrolyte.

In another embodiment, the top 112 may not have holes, but may be configured such that the battery cables access the terminals of the battery through an opening between the top 112 and side walls 118, 120, and 122. The top 112 may include an apparatus to selectively couple the top 112 with the side wall 122. The apparatus may include a magnetic element, a hook and loop fastener, a snap, a button, or a twisting mechanism to join the top 112 and the side walls 118, 120, and 122.

The outer layer 104 of the battery pouch 102 may include ridges that define a plurality of voids between a wall of the battery 110 and an exterior surface of the battery pouch 102. The absorbent layer 106 may be disposed in the voids between consecutive ridges and between the wall of the battery 110 and the exterior surface of the battery pouch 102. This embodiment may improve the assembly of the battery 110 within the pouch 102 as the resistance between the walls of the battery and the ridges may be less than the resistance of the walls of the battery 110 and the area of the absorbent layer 106. The ridges may be configured to form a T-shape from a surface of the outer layer 104 such that the absorbent layer 106 may be disposed in the voids between consecutive ridges and between the wall of the battery 110 and the exterior surface of the battery pouch 102, and the T-shape structure generally holds the absorbent layer 106 in place during insertion and removal of the battery 110 from the pouch 102.

Another embodiment may include a plurality of attachment points for the outer layer 104 and the absorbent layer 106. The attachment points may include quilting of the outer layer 104 of the battery pouch 102 and the absorbent layer 106. Another embodiment may include a plurality of attachment points of the outer layer 104 and the inner layer 108. This may include quilting of the outer layer 104 and the inner layer 108 such that the absorbent layer 106 and the material impregnated within the absorbent layer 106 are generally uniformly maintained.

FIG. 2A is an exploded view of an exemplary battery system 200 including a battery 220, battery tray 226, and battery pouch 202 having integrated handles 216. The pouch 202 includes a bottom wall 224, also referred to as a bottom, and side walls 204, 206, 208, and 210. The bottom 224 and side walls 204, 206, 208, and 210 are sealed to contain the battery contents. In this exemplary illustration, opposing sidewalls 204 and 206 are extended beyond a height of the battery 220 and a height of the other sidewalls 208 and 210. The top flaps 212 and 214 that extend above the height of the other side walls 208 and 210 are configured to fold over to secure them in place. The flaps 212 and 214 are shown to include a first handle 216A and a second handle 216B commonly referred to as handles 216 integrated into the pouch to aid in lifting the battery 220. The flaps 212 and 214 also are sized and positioned to allow accessibility of a first terminal 222A and a second terminal 222B commonly referred to as terminals 222 of the battery when the flaps 212 and 214 are folded over. The handle 216A is shown configured with an apparatus 218 to selectively couple the flap 212 with the flap 214. The apparatus 218 may include a magnetic element, a hook and loop fastener, a snap, a button, or a twisting mechanism to join the flaps 212 and 214.

FIG. 2B is a perspective view of an exemplary battery system 250. The battery system 250 is shown assembled having the terminals accessible through the handles 216. However, battery cables from the vehicle may be connected with the battery and then the top flaps 212 and 214 can be secured over the terminals with the cables thereby being accessible via a gap between a front sidewall 208 and the top flaps 212 and 214, or a gap between a back sidewall 210 and the top flaps 212 and 214.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle battery system comprising:
   a battery;
   a battery tray configured to support the battery; and
   a pouch having a plurality of side walls and a bottom defining a space sized to accommodate the battery, wherein one of the plurality of side walls includes a wedge configured to be carried by a bottom lip of the battery, and guided by and secured to the battery tray.

2. The system of claim 1, wherein the wedge defines a hole generally aligned with a threaded receiver of the battery tray and configured to permit a bolt to pass thru the hole to secure the wedge to the battery tray.

3. The system of claim 1, wherein the wedge defines a slot generally aligned with a threaded receiver of the battery tray and configured to permit a bolt to pass thru the slot to secure the wedge to the battery tray.

4. The system of claim 1 further including a top wall extending from one of the plurality of side walls and sized and configured to fold over a top of the battery.

5. The system of claim 4, wherein the top wall further defines two openings generally aligned with terminals of the battery to allow the terminals to pass through the openings.

6. The system of claim 1, wherein two opposing side walls extend beyond a height of the battery such that the opposing side walls connect when folded over a top of the battery.

7. The system of claim 6, wherein the two opposing side walls define two slots configured as handles to facilitate lifting the pouch.

8. A vehicle comprising:
   an interior compartment;
   a battery having an acidic electrolyte;
   a battery tray disposed within the interior compartment and configured to support the battery; and
   a pouch having a plurality of side walls and a bottom defining a space sized to accommodate the battery, wherein the plurality of side walls each include an absorbent layer containing a base and an outer layer impervious to the electrolyte and the base, wherein one of the plurality of side walls includes a wedge configured to cooperate with a bottom lip of the battery and the battery tray to secure the battery to the battery tray, wherein the wedge defines a hole generally aligned with a threaded receiver of the battery tray and configured to permit a bolt to pass thru the hole to secure the wedge to the battery tray, and wherein two opposing side walls extend beyond a height of the battery such that the opposing side walls connect when folded over a top of the battery.

9. The vehicle of claim 8, wherein the base is a carbonate or hydroxide of an alkali or alkaline earth metal.

10. The vehicle of claim 8, wherein the two opposing side walls define two slots configured as handles to facilitate lifting the pouch.

11. The vehicle of claim 8, wherein the interior compartment is a trunk or passenger compartment.

12. A vehicle battery pouch arrangement comprising:
    a pouch having a plurality of side walls, a bottom wall, and a top wall, defining a space sized to accommodate a battery, wherein the plurality of side walls each include an absorbent layer containing a base and an outer layer impervious to an acid and the base, wherein the top wall extends from one of the plurality of side walls and is configured to fold over a top of the battery, wherein one of the plurality of side walls includes a wedge configured to cooperate with a bottom lip of the battery and a battery tray to secure the battery to the battery tray, and wherein the wedge defines a hole generally aligned with a threaded receiver of the battery tray and configured to permit a bolt to pass thru the hole to secure the wedge to the battery tray.

13. The arrangement of claim 12, wherein the top wall further defines two openings generally aligned with terminals of the battery allowing the terminals to pass through the openings.

* * * * *